United States Patent
Coffey et al.

(10) Patent No.: US 6,474,290 B1
(45) Date of Patent: Nov. 5, 2002

(54) ENGINE COVER

(75) Inventors: Anthony L. Coffey, Grafton; Jonathan R Chittenden, Sheboygan; Jerry R Reineking, Cleveland, all of WI (US)

(73) Assignee: Kohler Co., Kohler, WI (US)

(*) Notice: Subject to any disclaimer, the term of this patent is extended or adjusted under 35 U.S.C. 154(b) by 0 days.

(21) Appl. No.: 09/733,531

(22) Filed: Dec. 8, 2000

Related U.S. Application Data

(60) Provisional application No. 60/214,993, filed on Jun. 29, 2000.

(51) Int. Cl.⁷ ................................................ F01M 9/10
(52) U.S. Cl. ............................. 123/198 E; 123/198 C
(58) Field of Search .......................... 123/198 E, 198 L

(56) References Cited

U.S. PATENT DOCUMENTS

| | | | |
|---|---|---|---|
| 4,202,296 A | 5/1980 | Nonnenmann et al. | 123/41.48 |
| 4,221,546 A | 9/1980 | Papst et al. | 417/354 |
| 4,329,946 A | 5/1982 | Longhouse | 123/41.49 |
| 4,548,548 A | 10/1985 | Gray, III | 416/189 |
| 4,566,852 A | 1/1986 | Hauser | 415/182 |
| 4,969,939 A * | 11/1990 | Machado | 123/198 E |
| 4,995,891 A * | 2/1991 | Jaynes | 123/198 E |
| 5,183,382 A | 2/1993 | Carroll | 415/173.6 |
| 5,197,426 A | 3/1993 | Frangesch et al. | 123/198 |
| 5,285,754 A | 2/1994 | Bell | |
| 5,365,901 A * | 11/1994 | Kiczek | 123/195 C |
| 5,377,632 A * | 1/1995 | Aronsson et al. | 123/198 E |
| 5,391,212 A * | 2/1995 | Ernst et al. | 123/198 E |
| 5,423,660 A | 6/1995 | Sortor | 416/189 |
| 5,746,168 A | 5/1998 | Lochbrunner et al. | |
| 5,762,034 A | 6/1998 | Foss | 123/41.49 |
| 5,813,384 A * | 9/1998 | Lavender et al. | 123/198 E |
| 5,899,182 A * | 5/1999 | Martinsson et al. | 123/90.38 |
| 6,099,372 A * | 8/2000 | Toyama | 123/195 C |
| 6,167,862 B1 * | 1/2001 | Powell et al. | 123/198 E |
| 6,213,074 B1 * | 4/2001 | Freese | 123/195 C |
| 6,216,661 B1 * | 4/2001 | Pickens et al. | 123/198 E |

* cited by examiner

*Primary Examiner*—Noah P. Kamen
*Assistant Examiner*—Jason Benton
(74) *Attorney, Agent, or Firm*—Quarles & Brady LLP

(57) ABSTRACT

A housing includes a removable cover having a top side and downwardly extending side walls covers a fixed cradle containing an internal combustion engine. The side walls define a plurality of outwardly opening recessed grooves extending from a bottom edge to a plurality of catches. A plurality of stretchable straps are disposed in the recessed grooves with fixed ends attached to the engine cradle and opposite free ends defining tabs that engage the catches to bias the cover to the engine cradle. The cover also defines an air baffle at the top side having a venturi nozzle defined by a convex circumferential surface having a narrowing diameter from top to bottom so that air drawn into engine through the nozzle is essentially non-turbulent. At one end, the cover houses an air filter and has a downwardly extending hold-down to limit movement of the air filter.

14 Claims, 3 Drawing Sheets

ENGINE COVER

CROSS-REFERENCE TO RELATED APPLICATIONS

This application claims the benefit of provisional application No. 60/214,993 filed on Jun. 29, 2000.

STATEMENT REGARDING FEDERALLY SPONSORED RESEARCH OR DEVELOPMENT (Not Applicable.)

FIELD OF THE INVENTION

The field of the invention relates to internal combustion engines, more particularly to housings for covering compact internal combustion engines, such as those used in lawn mowers, snow blowers, generators and the like.

DESCRIPTION OF THE BACKGROUND ART

Internal combustion engines are used to convert chemical energy to mechanical or electrical energy for a wide variety of applications. Some internal combustion engines are compact and have one or two small cylinders for use in low to moderate power applications, while others have a higher number of large cylinders for use in high power applications. Engines of any type or size generate a great deal of heat due to the combustion process. Large engines, such as in an automobile, are typically enclosed in an isolated area, such as under the hood and in front of a firewall of a car. As such, large engines are ordinarily out of reach of their users or passersby. However, compact engines are typically used in devices, such as lawn mowers, in which the engines are openly accessible. Thus, compact internal combustion engines often have a guard or shield over the engine to reduce the risk of someone contacting a hot engine and being burnt.

In some cases, such as in lawn mowers, the engine is partially or totally covered by a housing usually made of plastic or some other non-conducting material. Engines have a number of sub-assemblies and systems that may also radiate heat. Typically, separate housings cover, for example, the air filtration system and the cooling system. Additionally, baffles to direct air to the engine cooling system and air intake are usually attached to the housings. Each of these housings and baffles require fastening systems, which increases part count and complexity of manufacture and assembly. The plurality of housings typically must be disassembled and reattached using tools. Moreover, the housings for sub-systems are often nested beneath the main or other housings, such that multiple housings may have to be removed to access a single sub-system. Multiple housings and cumbersome fastening systems render servicing the engine and its subassemblies difficult.

Accordingly, an improved housing for a compact internal combustion engine is needed.

BRIEF SUMMARY OF THE INVENTION

The present invention provides an improved housing for an internal combustion engine having a cover of one piece construction. Removing the cover allows access to multiple systems of the engine needed to be maintained. The cover is held to an engine cradle or mounting frame by resilient straps allowing the cover to be assembled and removed easily without the use of tools.

Specifically, the cover has a top side and downwardly extending side walls sized to cover a fixed cradle containing the engine. At least one of the side walls defines an outwardly opening recessed groove extending from a bottom edge to a catch. A strap fits within the recessed groove which has a fixed end attached to the engine cradle and a free end removably engageable with the cover catch. Engagement of the catch with the free end of the strap secures the cover to the engine cradle.

The strap is preferably a rubber material and the free end includes a tab that engages the catch. The tab has a projecting end for grasping the strap to engage and disengage the strap from the cover. The strap is stretchable and sized so that it is under tension when engaged with the catch so as to bias the cover toward the engine cradle. In one embodiment, the cover includes a plurality of recessed grooves each retaining a stretchable strap for securing the cover to the engine cradle. Moreover, the engine cradle has side walls defining inwardly opening longitudinal slots in which the stretchable straps are in part disposed.

The cover includes a baffle at the top side defining a convex opening having smooth inwardly tapered walls to direct air into the housing in an essentially non-turbulent condition. Curved raised surfaces in the baffle serve to direct air into the opening. In one embodiment, a bezel attached to the top side of the cover retains a screen for covering the opening. The cover encloses an engine air filter and includes a hold-down extending down from the top side of the cover for limiting the movement of the air filter. Preferably, the cover is a glass-filled polypropylene material.

In one preferred form, the housing of the present invention includes an engine cradle defining a volume for containing the engine and fixed with respect to the engine. A removable cover having a top side and downwardly extending side walls covers the engine cradle. The side walls define a plurality of recessed grooves extending from a bottom edge to a plurality of catches. A plurality of stretchable straps are disposed in the recessed grooves with fixed ends attached to the engine cradle and opposite free ends defining tabs that engage the catches to bias the cover to the engine cradle. The cover also defines an air baffle at the top side having a nozzle defined by a convex circumferential surface having a narrowing diameter from top to bottom so that air drawn into engine volume through the nozzle is essentially non-turbulent state.

One object and advantage of the present invention is to provide an engine housing allowing easy access to the engine. This is accomplished by using a single cover enclosing the entire engine. Because the entire engine is enclosed by a single cover, additional covers are not required for sub-systems of the engine. This also allows an operator to quickly and easily examine at a glance parts of the engine other than the area being serviced.

Another object and advantage of the present invention is to provide a cover that can be assembled and removed without using tools. This is accomplished by using stretchable tie down straps which engage catches in the cover to bias the cover to the engine cradle.

Yet another object and advantage of this invention is to provide a housing that provides increased air flow to the engine. This is accomplished by directing air to the engine cooling system in an essentially non-turbulent state. The convex opening in the top of the cover acts as a venturi opening providing high-speed laminar air flow to the engine.

Still another object and advantage of this invention is to provide a housing that helps to secure a removable air cleaner. This is accomplished by a vertical wall integrally depending from the top of the cover to restrain the movement of the air cleaner.

A further advantage of the present invention is that the cover is made of a glass-filled polypropylene making it durable and resistant to thermal conduction.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
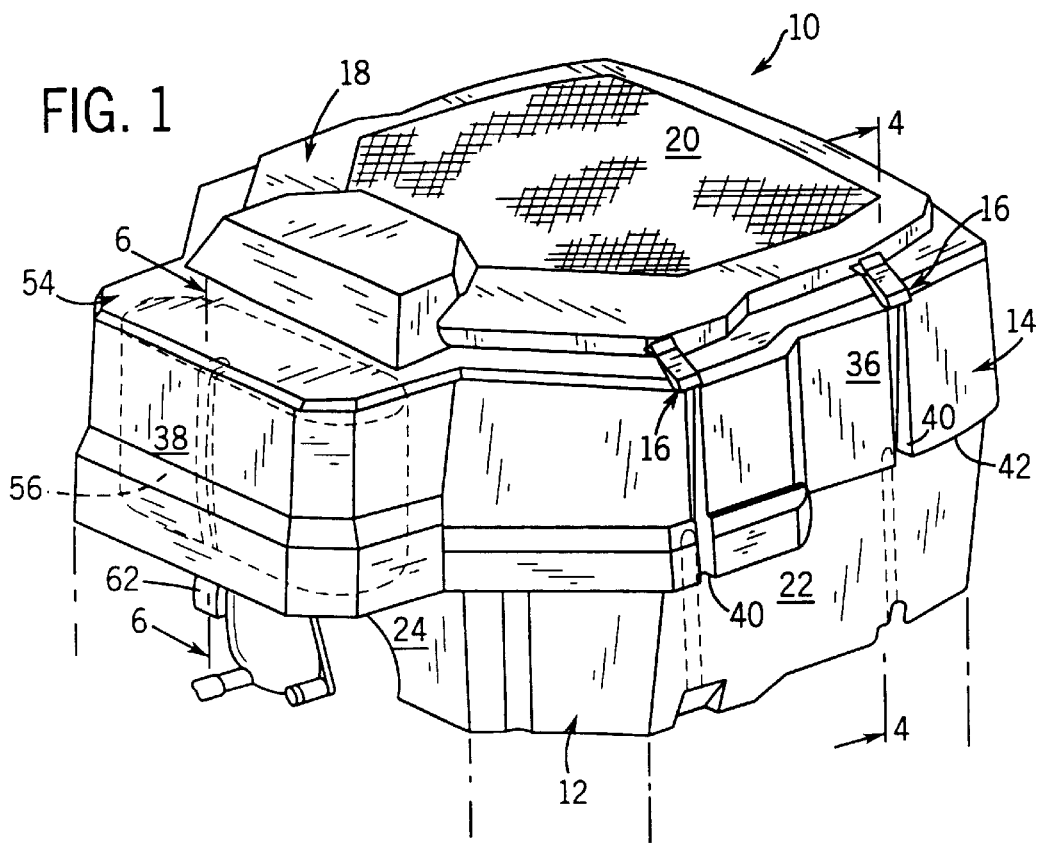
FIG. 1 is a perspective view of an internal combustion engine housing according to the present invention.

The housing of the present invention is referred to throughout the drawings by reference number 10. Referring to FIG. 1, generally the housing 10 includes an engine cradle 12 defining a cavity for containing a compact internal combustion engine, as are known in the art. A cover 14 is attached to the cradle 12 by a plurality of straps 16. A bezel 18 snaps onto the cover 14 so as to retain a screen 20.

Figure 3:
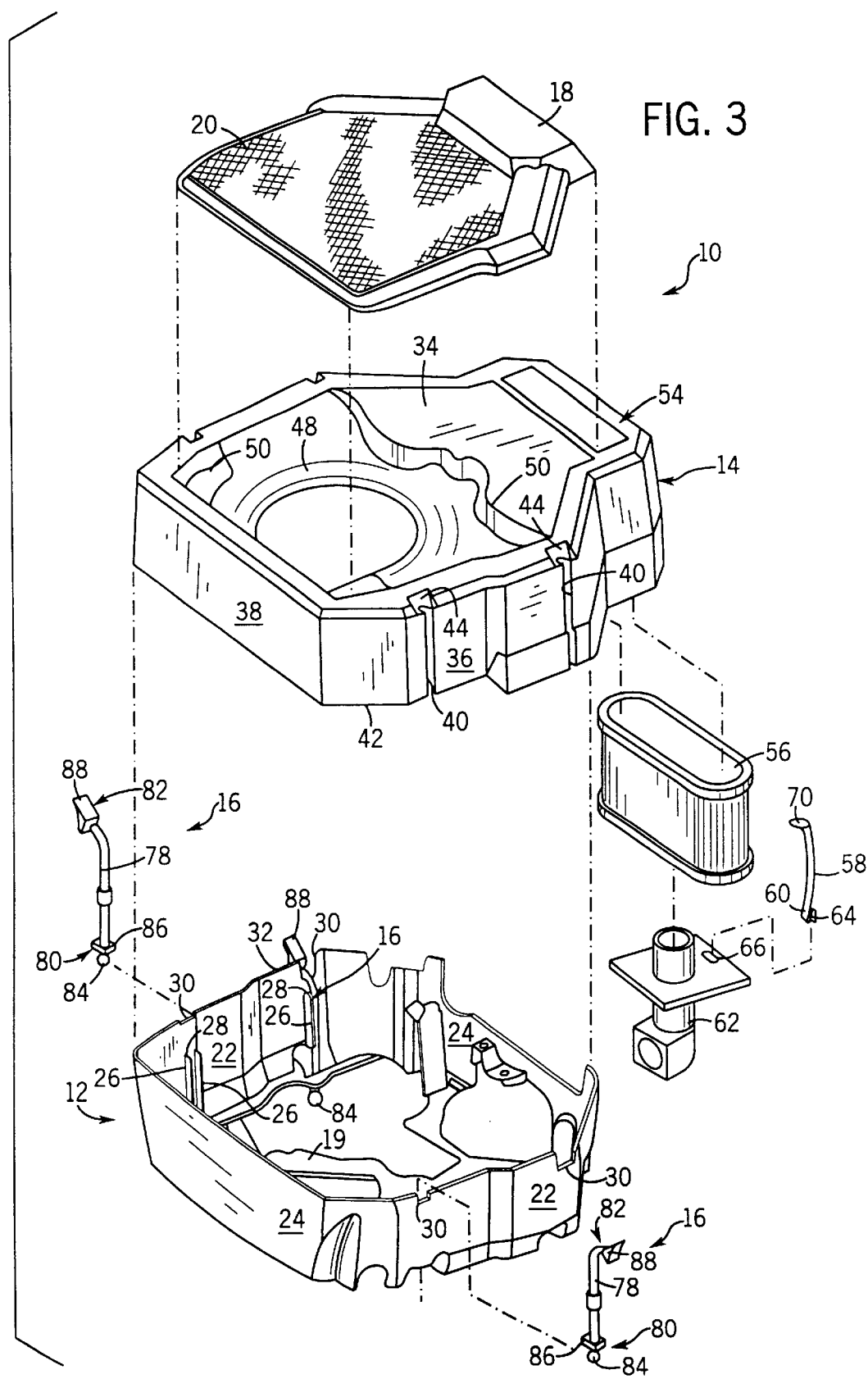
FIG. 3 is an assembly view of the engine housing of FIG. 1.

Referring to FIGS. 1 and 3, the cradle 12 is preferably molded of a glass-filled nylon to include a bottom framework 19 and upstanding side 22 and end 24 walls. Each sidewall 22 has two pairs of ridges 26 projecting from their inner surfaces forming slots 28. Above each slot is a notch 30 at a top edge 32 of the cradle sidewalls 22. The cover 14 is molded of a glass-filled polypropylene to include a baffle 34 at a top side with side 36 and end 38 walls extending downwardly along the perimeter of the baffle 34 sized to overlap the cradle 22 and 24 walls and encapsulate the engine (not shown). The cover sidewalls 36 are formed to include two parallel longitudinal recesses 40 each extending from a bottom edge 42 of the sidewalls 36 to a recessed catch 44. The recesses 40 are positioned to be aligned with the cradle slots 28 when the cover 14 is assembled to the cradle 12.

Figure 2:
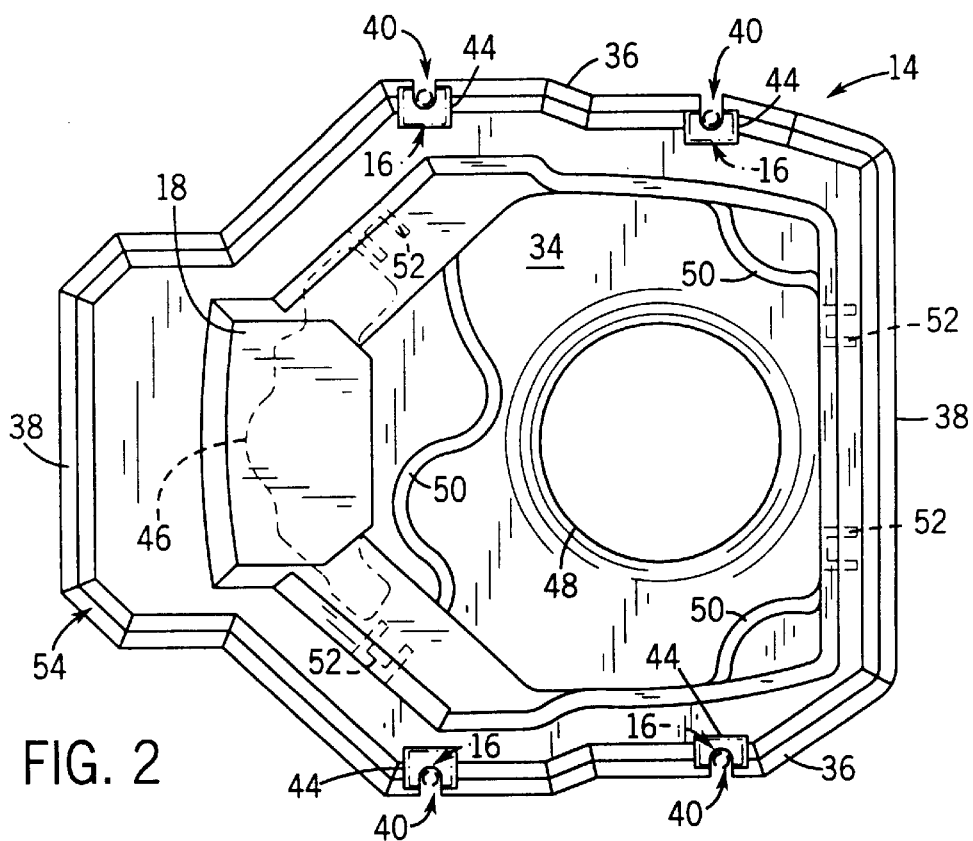
FIG. 2 is a top view of a cover of the engine housing of FIG. 1, shown without a removable bezel and screen.

Referring to FIGS. 2 and 3, the cover baffle 34 includes a winged opening (shown in phantom) 46 providing clearance for a radiator fill neck (not shown) and engine air hoses (not shown). The baffle 34 also forms a smooth convex opening 48, having a circular cross-section. The convex opening 48 has a gradually decreasing circumference from outside to inside the cover 14. This convex opening 48 provides a venturi effect, as known in the art, providing a smooth, essentially not turbulent transition flow past the cover 14. This allows air to be at a relatively high velocity laminar flow as it enters the intake centrifugal fan (not shown), thereby increasing air flow to the engine and increasing fan efficiency, as is understood by those skilled in the art. Smooth, wavy raised surfaces 50 are formed in the cover 14 around the convex opening 48 to aid in directing air therethrough.

Referring to FIGS. 2 and 3, the screen 20, preferably made of a polymer-coated steel wire mesh, is secured over the winged opening 46 and the convex opening 48 to prevent debris from entering the housing 10 and the engine intake. As mentioned, the screen 20 is held in place by the bezel 18. The bezel 18 is preferably made of a glass-filled polypropylene material and is snapped onto the cover 14 by four clips 52 (shown in phantom in FIG. 2) integrally formed in the cover 14. The clips 52 can be depressed so as to remove the bezel 18, and thereby the screen 20, from the cover 14. This allows the screen 20 to be cleaned, repaired or replaced without using tools.

Figure 6:
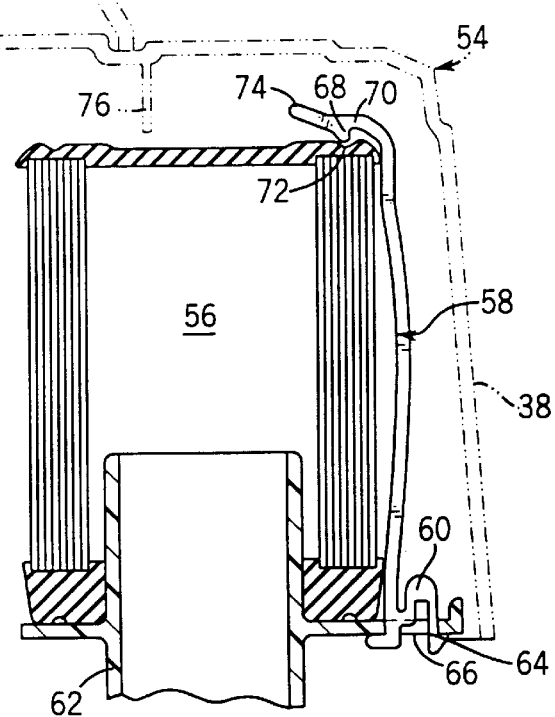
FIG. 6 is a cross-sectional view taken along line 6—6 of FIG. 1, showing an engine air cleaner contained within an air cleaner cover having an integral hold-down.

Referring to FIGS. 2, 3 and 6, a tabbed end 54 of the cover 14 encloses a removable air cleaner 56 secured to the cradle 12 by an air cleaner tie-down 58 attached at a bottom end 60 to an air intake elbow 62 via a tab 64 and slot 66 arrangement. Referring to FIG. 6, a catch 68 at the top end 70 of the air cleaner tie-down 58 engages a recess 72 in the top of the air cleaner 56. The catch 68 can be disengaged by pulling up at a grip 74 at the top of the air cleaner tie-down 58. The air cleaner tie-down 58 is preferably a rigid plastic. Additionally, the cover 14 is formed to include a downwardly depending wall 76 positioned to be above the air cleaner 56 when the cover 14 is assembled to the cradle 12. The wall 76 acts as a secondary hold-down for restricting the movement of the air cleaner 56.

Referring again to FIG. 3, the straps 16, preferably a resilient material, such as rubber, each have an elongated body 78 extending between a fixed end 80 and a free end 82. The fixed end 80 has a balled tip 84 and a squared shoulder 86 for engaging the cradle 12. The free end 82 has a tapered tab 88 extending generally transversely to the body 78 for grasping when stretching the straps 16 to assemble or remove the cover 14. The straps 16 can be separated from the cradle 12 for replacement if needed.

Figure 4:
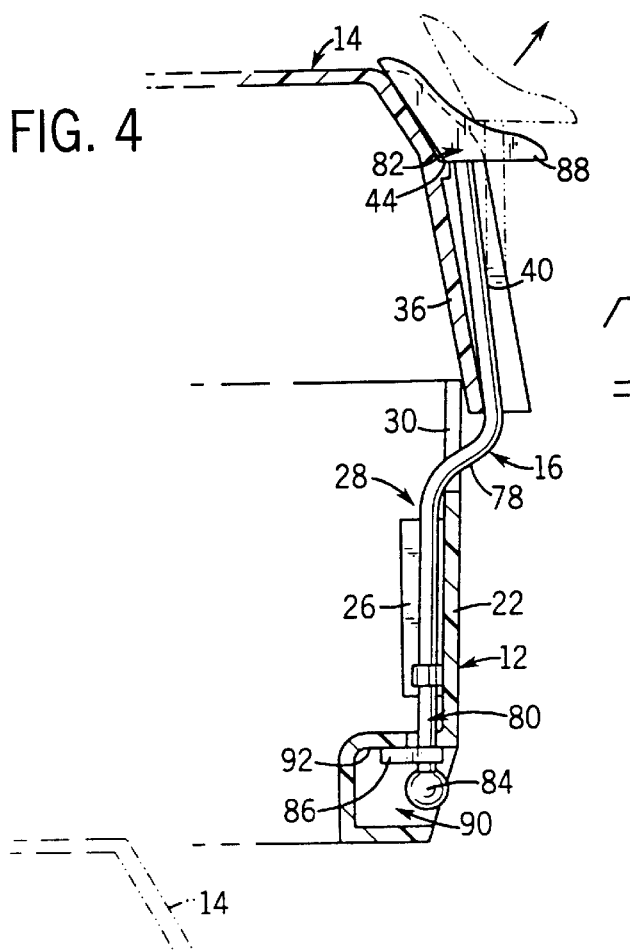
FIG. 4 is a cross-sectional view taken along line 4—4 of FIG. 1, showing the connection of the straps.

Referring to FIG. 4, the straps 16 are attached to the cradle 12 by inserting the fixed ends 80 through recessed openings 90 in the sidewalls 22 so that the strap shoulders 86 engage bottom surfaces 92 of the cradle sidewalls 22. The elongated bodies 78 are then fit within the slots 28 in the cradle 12 and bent outward through the notches 30 so that the strap tabs 88 are outside of the cradle 12.

Figure 5:
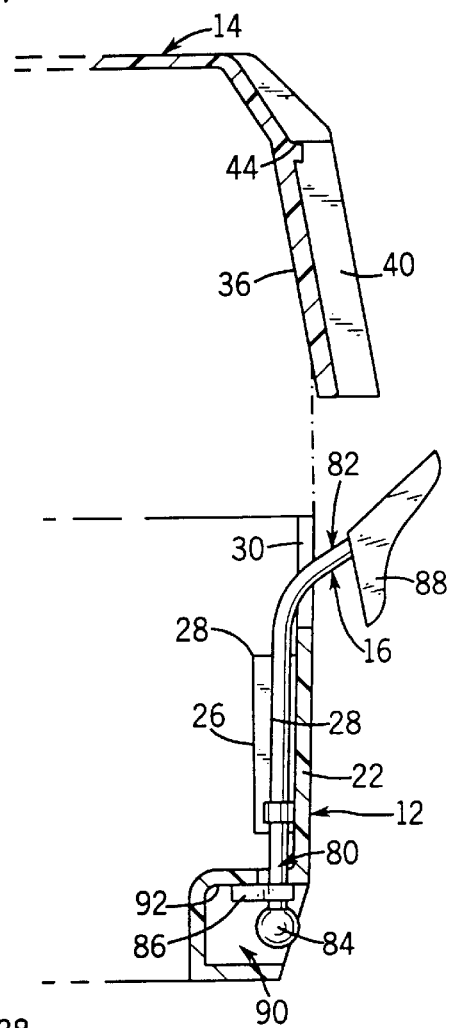
FIG. 5 is a cross-sectional view similar to FIG. 4 with the cover removed.

Referring to FIGS. 4 and 5, the cover 14 is assembled to the cradle 12 by lapping the cover walls 36 and 38 over the cradle walls 22 and 24 so that the cover recesses 40 align with the notches 30 in the cradle 12 that hold the free ends 82 of the straps 16. With the cover 14 in place, one by one each strap 16 is pulled up and out by the tab 88 so that the tab 88 engages the catch 44 in the cover 14. When the free end 82 is engaged as shown in FIG. 5, the strap bodies 78 lie in the recesses 40 of the cover 14. In this position, the resilience of the straps 16 bias the cover 14 downwardly against the cradle 12.

Thus, the present invention provides a durable engine housing that shields the operator from the engine and is resistant to thermal conduction. At the same time, the housing facilitates easy access to the engine by using a single cover to enclose the entire engine, thereby eliminating the need for additional covers for sub-systems of the engine, such as an air cleaner. This feature also allows an operator to quickly and easily examine parts of the engine other than the area being serviced. Moreover, the cover can be removed without using tools.

While there has been shown and described what are at present considered the preferred embodiment of the invention, it will be obvious to those skilled in the art that various changes and modifications can be made therein without departing from the scope of the invention.

We claim:

1. In a housing for an internal combustion engine disposed within an engine cavity defined by a fixed engine cradle, the improvement comprising:

a cover having a top side and downwardly extending side walls sized to cover the engine cradle, one of the side walls defining a recessed groove opening to the outside of the cover and extending from a bottom edge to a catch; and a strap stretchable within the recessed groove between a fixed end attached to the engine cradle and a free end removable engageable with the cover catch under tension so as to bias the cover toward the engine cradle and secure the cover to the engine cradle.

2. The improvement of claim 1, wherein the free end has a tab that engages with the catch and has a projecting end for grasping the strap.

3. The improvement of claim 2, wherein the cover includes a plurality of recessed grooves and further including a corresponding plurality of stretchable straps.

4. The improvement of claim 3, wherein the engine cradle has side walls defining longitudinal slots opening to the inside of the cradle in which the stretchable straps are in part disposed.

5. The improvement of claim 3, wherein the plurality of stretchable straps are rubber.

6. The improvement of claim 1, wherein the cover is a glass-filled polypropylene.

7. The improvement of claim 1, wherein the cover defines an integral air filter cover at one end of the cover having a hold down extending downwardly limiting the movement of an air filter supported by the engine cradle.

8. The improvement of claim 1, wherein the cover has a baffle at the top side defining a convex opening.

9. The improvement of claim 8, wherein the baffle also includes curved walls directing air into the convex opening.

10. The improvement of claim 9, further including a screen covering the convex opening.

11. The improvement of claim 10, wherein the screen is held down by a bezel that can be snapped onto the cover.

12. A housing for an internal combustion engine, comprising a fixed cradle containing the engine and a cover having a top side and integral side walls for enclosing the cradle, the cover having a catch for releasable engagement with a stretchable strap mounted at one end to the cradle for securing the cover to the cradle, wherein the cover integrally including an air baffle at the top side having a nozzle defined by a convex circumferential surface having a narrowing diameter from top to bottom such that air drawn into the housing through the nozzle is essentially non-turbulent.

13. A housing for an internal combustion engine, comprising:

an engine cradle defining a volume for containing the engine;

a removable cover having a top side and downwardly extending side walls sized to cover the engine cradle, the side walls define a plurality of recessed grooves opening outwardly and extending from a bottom edge to a top edge having a plurality of catches; and a plurality of stretchable straps disposable in the plurality of recessed grooves and having fixed ends attached to the engine cradle and opposite free ends defining tabs that are engageable with the catches to bias the cover to the engine cradle such that the cover can be removed from the engine cradle by stretching the straps so that the tabs disengage the catches and the straps are free from the recessed grooves;

wherein the cover also defines an air baffle at the top side having a nozzle defined by a convex circumferential surface with a narrowing diameter from top to bottom such that air drawn into engine volume through the nozzle is essentially non-turbulent.

14. The housing of claim 13, wherein the cover also includes an integral air filter cover at one end of the removable cover having a hold down extending down from the top side of the cover for limiting the movement of an air filter supported by the engine cradle.

* * * * *

UNITED STATES PATENT AND TRADEMARK OFFICE
CERTIFICATE OF CORRECTION

PATENT NO.    : 6,474,290 B1
DATED         : November 5, 2002
INVENTOR(S)   : Anthony L. Coffey et al.

It is certified that error appears in the above-identified patent and that said Letters Patent is hereby corrected as shown below:

Column 5,
Line 14, "removable" should be -- removably --.

Signed and Sealed this

Fifteenth Day of April, 2003

JAMES E. ROGAN
*Director of the United States Patent and Trademark Office*